US012796587B2

(12) United States Patent
Kale et al.

(10) Patent No.: US 12,796,587 B2
(45) Date of Patent: Nov. 17, 2026

(54) PROPORTIONATE AIR FLOW CONTROL FOR AIR CARTS

(71) Applicant: Deere & Company, Moline, IL (US)

(72) Inventors: Mandar M. Kale, Pune (IN); Shreyas V. Chouthai, Pune (IN); Sourin Ghosh, Pune (IN); Hemant A. Chaudhari, Pune (IN); Heeba E. Parkar, Pune (IN); Tejal Sarda, Pune (IN)

(73) Assignee: Deere & Company, Moline, IL (US)

( * ) Notice: Subject to any disclaimer, the term of this patent is extended or adjusted under 35 U.S.C. 154(b) by 123 days.

(21) Appl. No.: 19/037,824

(22) Filed: Jan. 27, 2025

(65) Prior Publication Data

US 2026/0215358 A1 Jul. 30, 2026

(51) Int. Cl.
*A01C 7/08* (2006.01)

(52) U.S. Cl.
CPC .................................... *A01C 7/082* (2013.01)

(58) Field of Classification Search
CPC .......... B65G 53/66; A01C 7/082; A01C 15/04
See application file for complete search history.

(56) References Cited

U.S. PATENT DOCUMENTS

| | | | | |
|---|---|---|---|---|
| 1,097,559 A * | 5/1914 | Persall | B65G 53/66 406/14 |
| 6,447,215 B1 * | 9/2002 | Wellmar | B65G 53/66 406/122 |
| 9,061,842 B2 * | 6/2015 | Vierling | B65G 53/66 |
| 9,867,329 B2 * | 1/2018 | Wendte | A01C 15/14 |
| 9,949,427 B2 * | 4/2018 | Schweitzer | A01C 7/102 |
| 9,999,174 B2 * | 6/2018 | Funck | A01C 7/04 |
| 11,352,222 B2 * | 6/2022 | Trushin | A01C 7/084 |
| 12,022,762 B2 * | 7/2024 | Thompson | A01C 15/006 |
| 12,102,031 B2 * | 10/2024 | Harmon | A01C 7/105 |

(Continued)

FOREIGN PATENT DOCUMENTS

| | | |
|---|---|---|
| CA | 2272445 A1 | 11/1999 |
| EP | 3146827 A1 | 3/2017 |
| EP | 3815497 A2 | 5/2021 |

OTHER PUBLICATIONS

Extended European Search Report and Written Opinion issued in European Patent Application No. 25220838.4 dated May 26, 2026, in 11 pages.

*Primary Examiner* — Joseph A Dillon, Jr.
(74) *Attorney, Agent, or Firm* — Tucker Ellis LLP

(57) ABSTRACT

An air cart includes a plurality of primary chutes. The air cart further includes a plurality of metering devices, where each metering device of the plurality of metering devices is coupled to a corresponding primary chute of the plurality of primary chutes and is configured to deposit seed at a metering rate within the corresponding primary chute of the plurality of primary chutes. The metering rate of each metering device is individually configurable. One or more blowers are configured to produce a plurality of airstreams within the plurality of primary chutes, such that each of the plurality of primary chutes has an air flow rate. A controller is configured to receive the metering rate of each metering device and individually control each air flow rate of the plurality of primary chutes based on the metering rate of the metering device coupled to the corresponding primary chute.

20 Claims, 7 Drawing Sheets

(56) References Cited

U.S. PATENT DOCUMENTS

| | | | | |
|---|---|---|---|---|
| 12,310,281 | B2 * | 5/2025 | Luebben | A01C 7/081 |
| 2016/0000003 | A1 * | 1/2016 | Wendte | A01M 7/006<br>239/159 |
| 2021/0298286 | A1 | 9/2021 | Ruppert et al. | |
| 2023/0380331 | A1 | 11/2023 | Thompson | |
| 2025/0244745 | A1 * | 7/2025 | Kale | A01C 7/081 |

* cited by examiner

PROPORTIONATE AIR FLOW CONTROL FOR AIR CARTS

FIELD OF THE DISCLOSURE

The present disclosure relates to air carts and, more particularly, to blower control for air cart seeder systems.

BACKGROUND

Conventional air carts, also known as air seeders, are vehicles used for depositing seed and/or fertilizer in soil. Individual meters receive a volume of seed from a seed container on the air cart, and deposit a particular amount of the seed into a plurality of primary chutes. A single blower is used to create an airstream through a set of multiple primary chutes to carry the seed through the primary chute, and deposit the seed into the soil as the air cart is driven.

Some air carts include adjustable meters that allow for individual meters to be manually adjusted so that they provide a higher or lower metering rate of the seed into the primary chute. However, the air stream through multiple primary chutes is produced by a common blower and therefore the airflow is not adjustable on an individual primary chute basis. As a result, a higher rate of running the blower may be required to accommodate the needs of one particular primary chute with a higher metering rate, but by doing so, this can negatively affect spacing of seeds or fertilizer in other primary chutes. Further, present blowers have high inertia and take a very long time to start and stop.

There is a need therefore for a system that allows for individual control of air flow through the individual primary chutes.

SUMMARY

In accordance with an aspect of an example implementation, an air cart includes a plurality of primary chutes, each primary chute of the plurality of primary chutes having a first end and a second end. The air cart further includes a plurality of metering devices, where each metering device of the plurality of metering devices is coupled to a corresponding primary chute of the plurality of primary chutes and is configured to deposit seed at a metering rate within the corresponding primary chute of the plurality of primary chutes at a location between the corresponding primary chute's first end and second end. The metering rate of each metering device is individually configurable. The air cart also includes one or more blowers configured to produce a plurality of airstreams within the plurality of primary chutes, such that each of the plurality of primary chutes has an air flow rate. A controller is configured to receive the metering rate of each metering device and individually control each air flow rate of the plurality of primary chutes based on the metering rate of the metering device coupled to the corresponding primary chute.

In certain embodiments, the one or more blowers is a plurality of blowers that includes a corresponding blower for each of the plurality of primary chutes.

In certain embodiments, the controller is configured to individually control each air flow rate by individually controlling the speed of each corresponding blower for each of the plurality of primary chutes, based on the metering rate of the metering device coupled to the corresponding primary chute.

In certain embodiments, the speed of each corresponding blower is proportional to the metering rate of the metering device coupled to the corresponding primary chute.

In certain embodiments, the one or more blowers is one blower.

In certain embodiments, the air cart further includes a plurality of air valves, each air valve of the plurality of air valves are coupled to a corresponding primary chute of the plurality of primary chutes such that the plurality of air valves are configured to restrict the plurality of airstreams within the plurality of primary chutes.

In certain embodiments, the controller is configured to individually control each air flow rate by individually controlling an opening value of each of the plurality of air valves based on the metering rate of the metering device coupled to the corresponding primary chute.

In certain embodiments, the opening value of each of the plurality of air valves is proportional to the metering rate of the metering device coupled to the corresponding primary chute.

In certain embodiments, the controller is configured to individually control the opening value of each of the plurality of air valves by referencing a table that associates the metering rate of the metering device coupled to the corresponding primary chute to a commanded opening value.

In certain embodiments, the plurality of air valves are dampers or aperture valves.

In certain embodiments, the air cart further includes a seed container. The seed container is configured to store the seed prior to being deposited within the primary chute, and the one or more blowers are coupled to the seed container and are configured to pressurize the seed container.

In accordance with another aspect of an example implementation, a method for depositing seeds using an air cart includes individually metering a quantity of seeds in each metering device of a plurality of metering devices, according to a metering rate that is individually configured for each metering device; depositing the quantity of seeds within each primary chute of a plurality of primary chutes, wherein each primary chute has a corresponding metering device of the plurality of metering devices; producing a plurality of airstreams within the plurality of primary chutes; and individually controlling an air flow rate in each of the plurality of primary chutes based on the metering rate of the metering device corresponding to the primary chute.

In certain embodiments, producing the plurality of airstreams involves operating a plurality of blowers that includes a corresponding blower for each of the plurality of primary chutes.

In certain embodiments, individually controlling the air flow rate involves individually controlling the speed of each corresponding blower for each of the plurality of primary chutes.

In certain embodiments, the speed of each corresponding blower is controlled to be proportional to the metering rate of the corresponding metering device.

In certain embodiments, producing the plurality of airstreams involves operating a blower and individually controlling an opening value of each air valve of a plurality of air valves coupled to a corresponding primary chute of the plurality of primary chutes.

In certain embodiments, the opening value of each of the plurality of air valves is proportional to the metering rate of the corresponding metering device.

In certain embodiments, individually controlling the air flow rate includes individually controlling the opening value of each of the plurality of air valves by referencing a table that associates the metering rate of the corresponding metering device to a commanded opening value.

In accordance with another aspect of an example implementation, an airflow control system includes one or more blowers configured to produce a plurality of airstreams within a plurality of primary chutes, such that each of the plurality of primary chutes has an air flow rate. The airflow control system further includes a controller configured to receive a metering rate of a plurality of metering devices that each correspond to each of the plurality of primary chutes, and individually control each air flow rate of the plurality of primary chutes based on the metering rate of the metering device of the corresponding primary chute.

In certain embodiments, a plurality of air valves, each air valve of the plurality of air valves coupled to a corresponding primary chute of the plurality of primary chutes such that the plurality of air valves are configured to restrict the plurality of airstreams within the plurality of primary chutes, and the controller is configured to individually control each air flow rate by individually controlling an opening value of each of the plurality of air valves based on the metering rate of the metering device coupled to the corresponding primary chute.

BRIEF DESCRIPTION OF THE DRAWINGS

In the accompanying drawings which are incorporated in and constitute a part of the specification, embodiments of the disclosure are illustrated, which, together with the general descriptions given above, and the detailed description given below, serve to exemplify the embodiments of this disclosure.

DETAILED DESCRIPTION

In the following description reference is made to the accompanying figures which form a part thereof, and in which is shown, by way of illustration, one or more example embodiments of the disclosed foldable agricultural equipment systems and methods. Various modifications of the example embodiments may be contemplated by one of skill in the art.

Often, metering devices in air carts, also known as air seeders, are individually configurable to adjust the metering rate of the seed. The metering devices receive a volume of seeds from a seed container and deposit seeds into a corresponding primary chute. An airstream through each primary chute carries the seed through the primary chute so that the seeds exit the primary chutes and are eventually deposited in soil. In certain embodiments described herein, air flow rates of the airstreams through each primary chute are individually controllable based on the metering rate of the corresponding metering device. The individualized control of the air flow rates can be achieved using different methods and arrangements. In one embodiment, a plurality of blowers can be utilized, including one blower corresponding to each primary chute. A controller can control each individual blower in order to individually adjust the flow rate of the airstreams through each primary chute in response to the configured metering rate of each corresponding metering device. In a second embodiment, one blower can be utilized, and a controller can control a set of air valves to individually adapt the air flow rate through each primary chute in response to the configured metering rate of each corresponding metering device.

Figure 1:
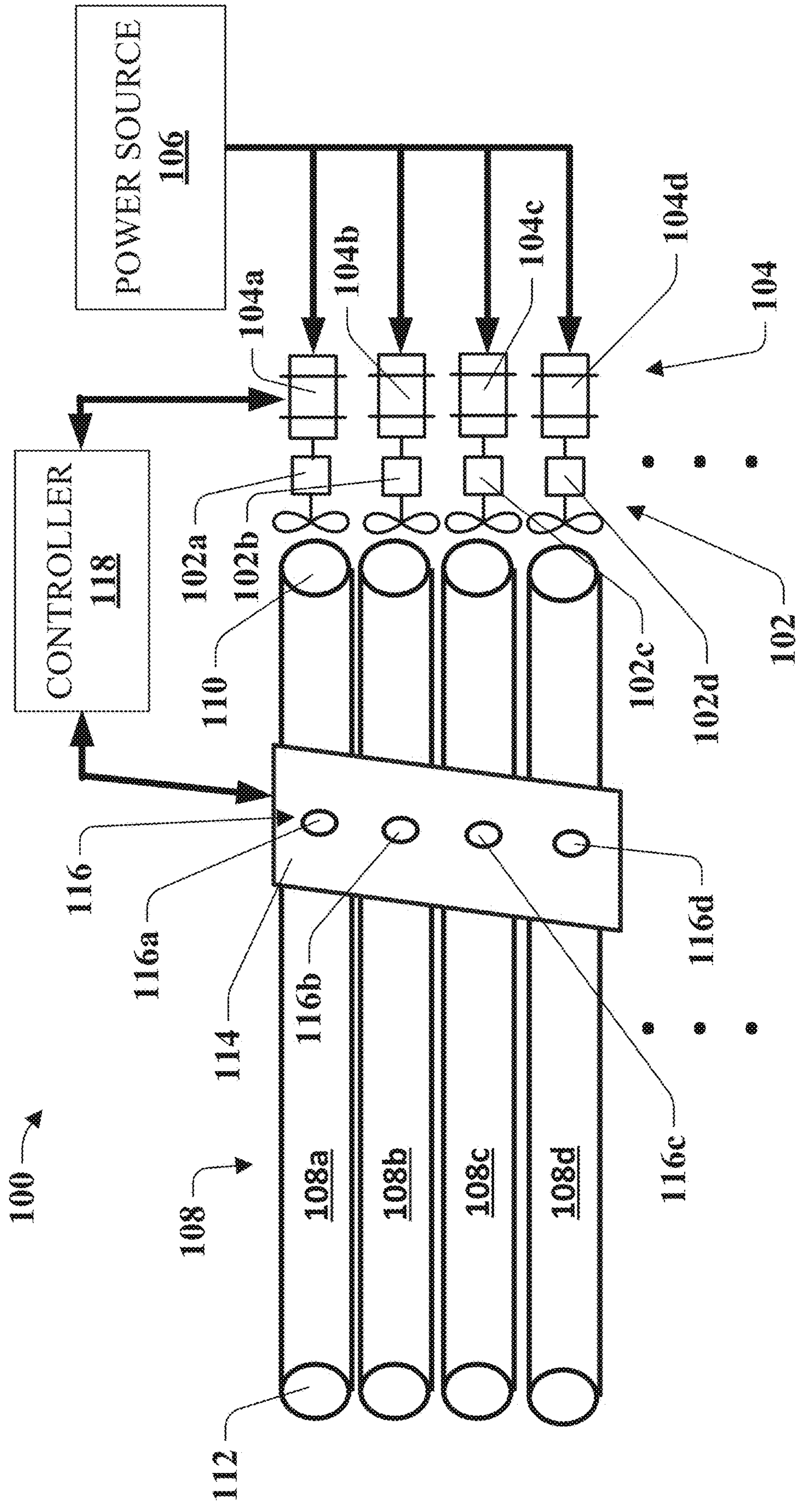
FIG. 1 is a schematic drawing of an exemplary embodiment of an air cart system.

Referring to FIG. 1 of the present disclosure, an air cart system 100 is shown. The air cart system 100 can be incorporated into an air cart or air seeder vehicle. A set of blowers 102 can be mounted to the air cart. Each blower 102*a*-102*d* of the set of blowers 102 is mechanically coupled with a corresponding electric motor 104*a*-104*d* of a set of electric motors 104. The electric motors 104*a*-104*d* are powered by a power source 106 and operate their corresponding blowers 102*a*-102*d*. The power source 106 can be chosen using sound engineering judgment, and can be, for example, a battery or an alternator, or an onboard generator.

The air cart system 100 further includes a set of primary chutes 108. Each primary chute 108*a*-108*d* has a first end 110 and a second end 112. It should be appreciated that while the first end 110 and second end 112 are only identified as to primary chute 108*a*, each of the primary chutes 108*a*-108*d* have a corresponding first end 110 and second end 112. A seed container 114 mounted to the air cart can hold a volume of material such as seed or fertilizer. It should be appreciated that the term seed as referred to herein means seed, fertilizer, or a mixture of seed and fertilizer. The air cart system 100 includes a set of metering devices 116, where each metering device 116*a*-116*d* is configured to receive seed from the seed container 114 and deposit an amount of seed within a corresponding primary chute 108*a*-108*d* at a metering rate, and at a location within the primary chute 108*a*-108*d* between the first end 110 and the second end 112. The metering rate at which the seeds are deposited by the metering device 116*a*-116*d* into the corresponding primary chute 108*a*-108*d* can be individually configured for each metering device 116*a*-116*d* such that each primary chute 108*a*-108*d* can have its own configurable metering rate at which seed is deposited into it from its corresponding metering device 116*a*-116*d*. The metering rate can be configured for each metering device 116*a*-116*d* by way of a local user interface, physical knobs, dials, switches, etc., or remotely by way of wired or wireless communications from a remote user interface.

Each primary chute 108*a*-108*d* has a corresponding blower 102*a*-102*d* coupled at its first end 110. The blower 102*a*-102*d* is operated by its electric motor 104*a*-104*d* and produces an airflow that flows from the first end 110 of the primary chute 108*a*-108*d*, through the primary chute 108*a*-108*d*, and out the second end 112. The seeds deposited by the metering device 116*a*-116*d* into the primary chute 108*a*-108*d* are carried in the airstream through the primary chute 108*a*-108*d* and are dispensed out of the second 112 and deposited into the soil. It should be appreciated that while FIG. 1 depicts four primary chutes 108*a*-108*d*, and four corresponding metering devices 116*a*-116*d*, blowers 102*a*-102*d*, and electric motors 104*a*-104*d*, the air cart system 100 can include any number of each, from 2 through n, where n is a positive integer.

A controller 118 can be configured to receive the metering rates of each metering device 116*a*-116*d* and individually control the speed of each corresponding blower 102*a*-102*d* for each of the primary chutes 108*a*-108*d* based on the metering rate of the metering device 116*a*-116*d* coupled to the corresponding primary chute 108-108*d*. In one example, the controller 118 controls the blowers 102*a*-102*d* to create an air flow rate that is proportional to the metering rate of the metering device 116*a*-116*d* coupled to the corresponding primary chute 108*a*-108*d*. Such motor control can be carried out by the controller 118 by, for example, applying an equation that takes into account the metering rate or by referring to a lookup table that associates operating speeds of the blower 102*a*-102*b* and or electric motor 104*a*-104*d* with values or ranges of metering rates.

It should be appreciated that by way of example and not limitation, the controller 118 (or controller 318 as discussed below) can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The controller 118 may be a microprocessor, but in the alternative, the controller 118 may be any processor, controller, microcontroller, or state machine. The controller 118 may also be implemented as a combination of computing devices, for example a combination of a DSP and a microprocessor, a plurality of microprocessors, multi-core processors, one or more microprocessors in conjunction with a DSP core, or any other such configuration.

Figure 2:
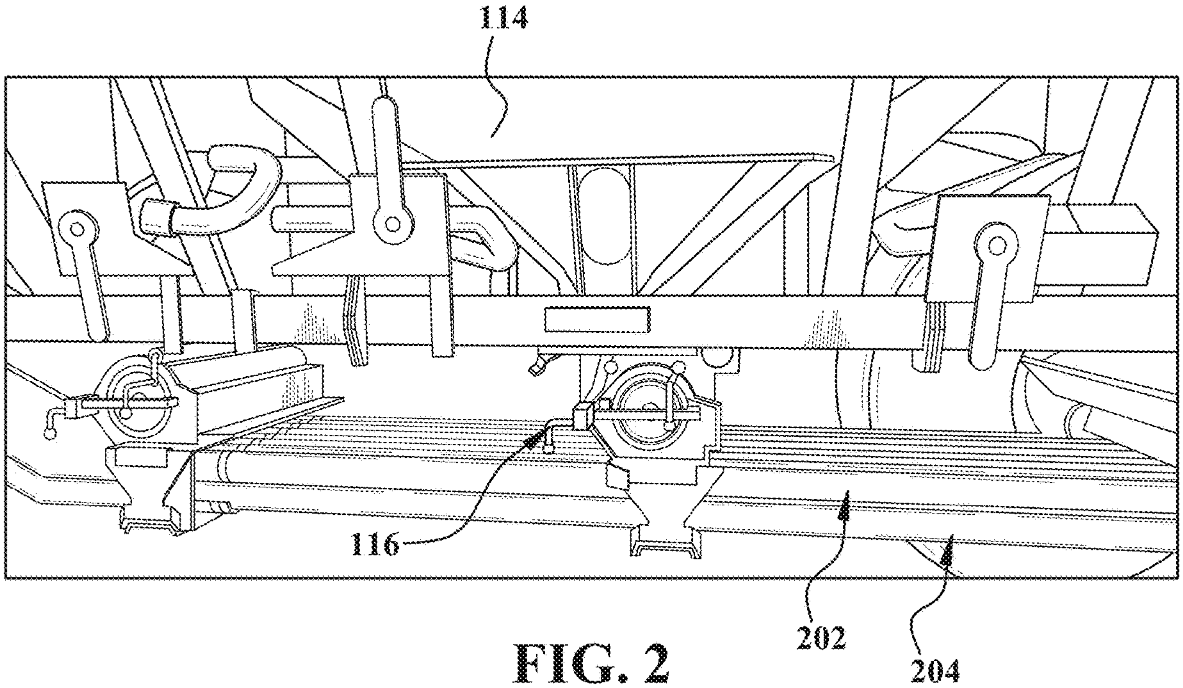
FIG. 2 is a view of exemplary primary chutes and metering devices attached to an air cart.

Turning now to FIG. 2, an exemplary arrangement of primary chutes 108 is shown. In one embodiment, the primary chutes 108 can be separated into a first set of primary chutes 202 and a second set of primary chutes 204. The first set of primary chutes 202 can be located above the second set of primary chutes 204. In certain embodiments, each individual primary chute of the first set of primary chutes 202 and the second set of primary chutes 204 can have its own corresponding metering device 116. In other embodiments, the first set of primary chutes 202 and the second set of primary chutes 204 can share a set of metering devices 116 such that the set of metering devices 116 can be arranged and adapted to meter seed into either of the first set of primary chutes 202 or the second set of primary chutes 204. In the embodiment depicted in FIG. 2, the first set 202 and the second set 204 each include eight primary chutes 108. The metering devices 116 are arranged above the primary chutes 108 such that seed can be fed from the seed container 114 into the metering devices 116. The metering devices 116 then deposit the seed into the respective primary chute 108 at the metering rate at which the particular metering device 116 is configured. The individually controlled air stream produced by the blower 102 that corresponds to the primary chute 108 carries the seed through the primary chute 108 at a flow rate that is determined by the controller 118 based on the metering rate.

Figure 3:
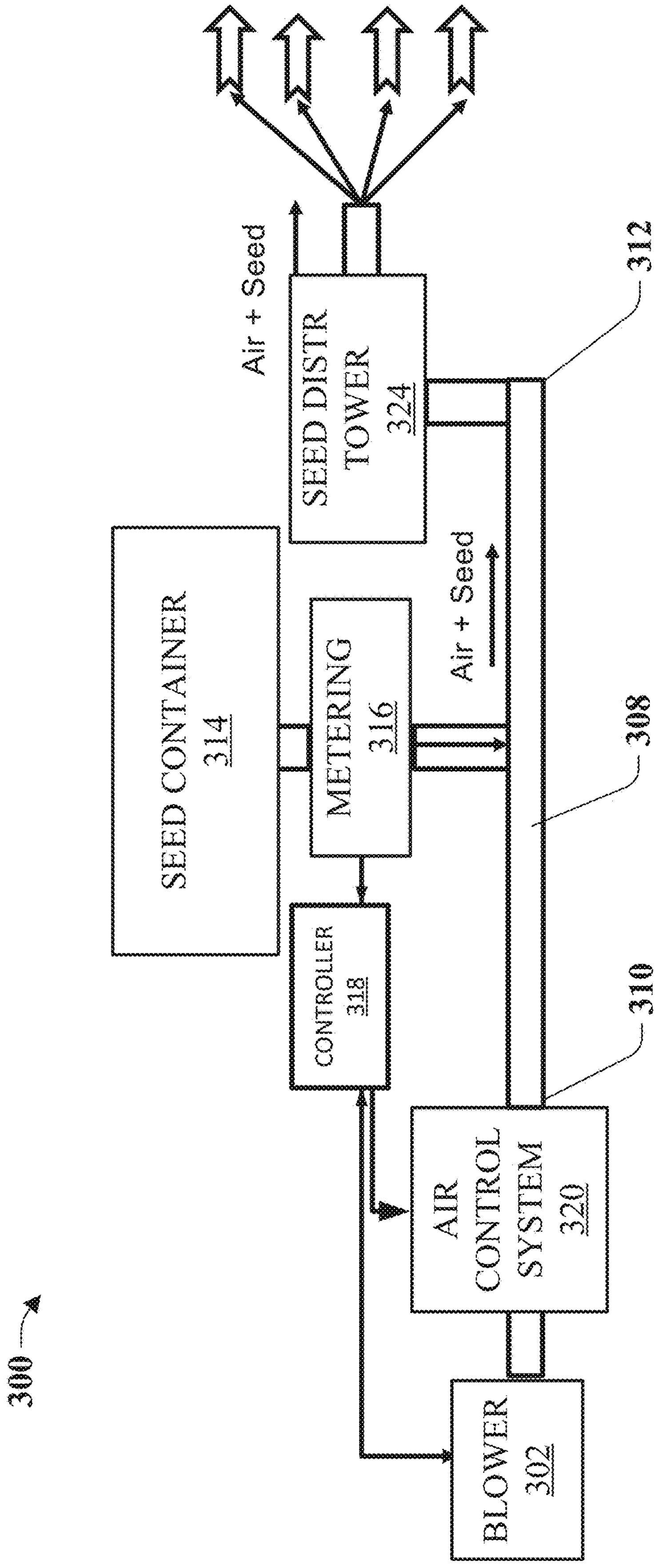
FIG. 3 is a schematic drawing of an exemplary embodiment of an air cart system.

Turning now to FIG. 3, another embodiment of an air cart system 300 is depicted. The air cart system 300, similar to air cart system 100, can include a blower 302 operated by an electric motor powered by a power source (not shown). The air cart system 300 further includes a set of primary chutes 308, where each primary chute 308 has a first end 310 and a second end 312. It should be appreciated that while the primary chutes 308 are depicted as a single block in FIG. 3, that the set of primary chutes 308 can include a plurality of primary chutes 308 having a quantity from 2 through n, where n is a positive integer. A seed container 314 is mounted to the air cart and can hold a volume of material such as seed or fertilizer. The air cart system 300 includes a set of metering devices 316, where each metering device 316 is configured to receive seed from the seed container 314 and deposit an amount of seed within a corresponding primary chute 308 at a metering rate, and at a location within the primary chute 308 between the first end 310 and the second end 312. The metering rate at which the seeds are deposited by the metering devices 316 into the corresponding primary chute 308 can be individually configured for each metering device 316 such that each primary chute 308 can have its own configurable rate at which seed is deposited into it from its corresponding metering device 316. The metering rate can be configured for each metering device 316 by way of a local user interface, physical knobs, dials, switches, etc., or remotely by way of wired or wireless communications from a remote user interface.

Figure 4:
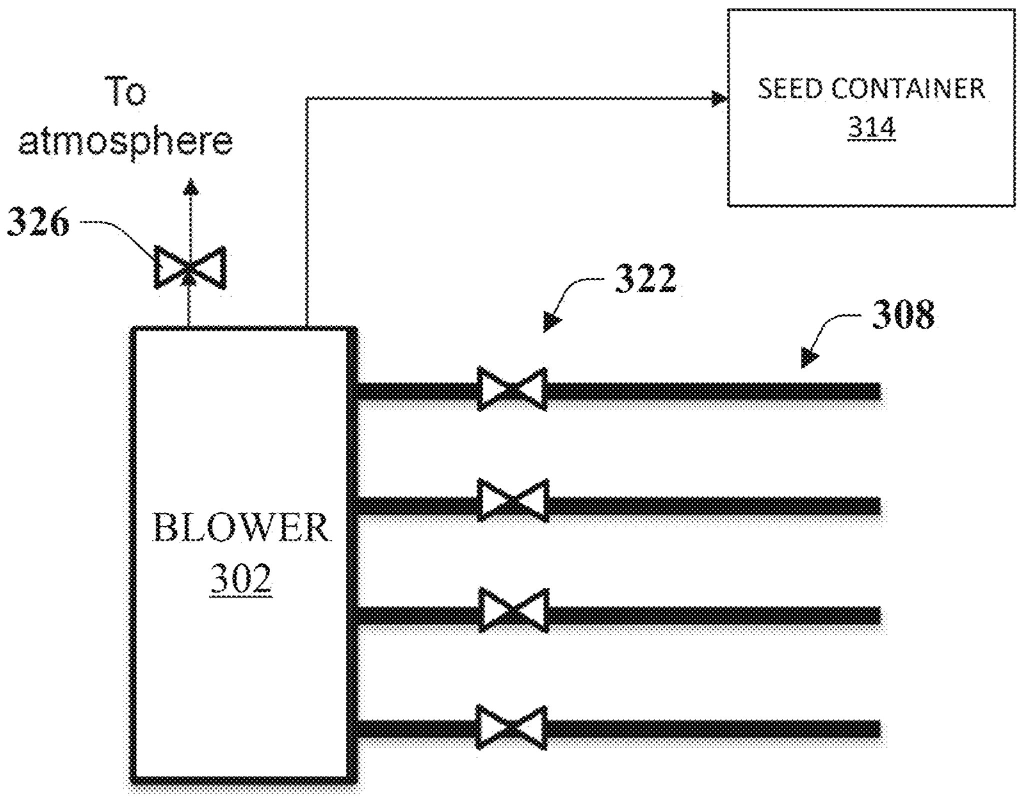
FIG. 4 is a schematic drawing of an exemplary embodiment of an air control system as part of an air cart system.

The air cart system 300 can further include an air control system 320. The air control system 320 can include a plurality of air valves 322 (as shown in FIG. 4). Each air valve 322 of the plurality of air valves 322 are coupled to a corresponding primary chute 308 of the plurality of primary chutes 308 such that the plurality of air valves 322 are configured to restrict and/or control a plurality of airstreams within the plurality of primary chutes 308. The blower 302, which may be a single blower 302, can provide air pressure and a resulting flow of air that enters each of the plurality of primary chutes 308. As the flow of air enters each primary chute 308 and passes through the air control system 320, the opening value (e.g. the position, opening size, or angle) of each individual air valve 322 in each primary chute 308 creates an individual air flow rate in each primary chute 308.

A controller 318 can be configured to receive the metering rates of each metering device 316 and individually control each air flow rate by individually controlling an opening value for each of the plurality of air valves 322 based on the metering rate of the metering device 316 coupled to the corresponding primary chute 308 in which the particular air valve 322 is coupled. In one example, the controller 318 controls the air valves 322 to create an air flow rate that is proportional to the metering rate of the metering device 316 coupled to the corresponding primary chute 308. Such air valve 322 control can be carried out by the controller 318 by, for example, applying an equation that takes into account the metering rate or by referring to a lookup table that associates opening values of the plurality of air valves 322 with values or ranges of metering device 316 metering rates. The controller 318 can also control the operation of the blower 302 including on/off status and speed of the blower 302. The controller 318 can also receive feedback from the blower 302 regarding its active parameters, status, current speed, etc. An increase in the speed of the blower 302 causes an increase in the air flow rate in every primary chute 308, and a decrease in the speed of the blower 302 causes a decrease in the air flow rate in every primary chute 308.

After passing through the air control system 320, the individual airflows through each of the primary chutes 308 mix with and carry the seed deposited into the primary chute by the respective metering device 316. Each air/seed mixture continues to pass through the primary chute 308 and is deposited out of the air cart system 300 through a seed distribution tower 324 at the second end 312 of the primary chutes 308 by way of, for example, openers.

FIG. 4 depicts additional components and features of the air cart system 300, which can similarly also apply to air cart system 100. As described above, each of the primary chutes 308 include an air valve 322 that creates individualized air flow in each of the primary chutes 308. In certain embodiments, the air valves 322 can be coupled directly to the blower casing of the blower 302. The air cart system 300 can further include a pressure relief valve on the blower casing containing the blower 302. For example, if the blower 302 accumulates an excessive amount of pressure (as measured by, for example, pressure sensors in the blower 302 or blower casing), the pressure relief valve 326 can open to release air pressure to the atmosphere.

Further, the blower 302 can be coupled to the seed container 314 by way of a tube, hose, or pipe to provide positive pressure to the seed container 314. The air flow can be controlled to the seed container 314 by way of a separate valve such as a diverter valve. Because of pressure caused by the air flow through the primary chutes 308, seed deposited by gravity alone through the metering device 316 can have a tendency to become stuck or accumulate above the primary chute 308 such that the seed cannot be deposited within the primary chute 308 because the seed cannot overcome the pressure within the primary chute 308. When the blower 302 pressurizes the seed container 314, the pressure within the seed container 314 allows the seeds deposited by the metering device 316 to overcome the pressure within the primary chutes 308 and enter the primary chutes 308.

Figure 5:
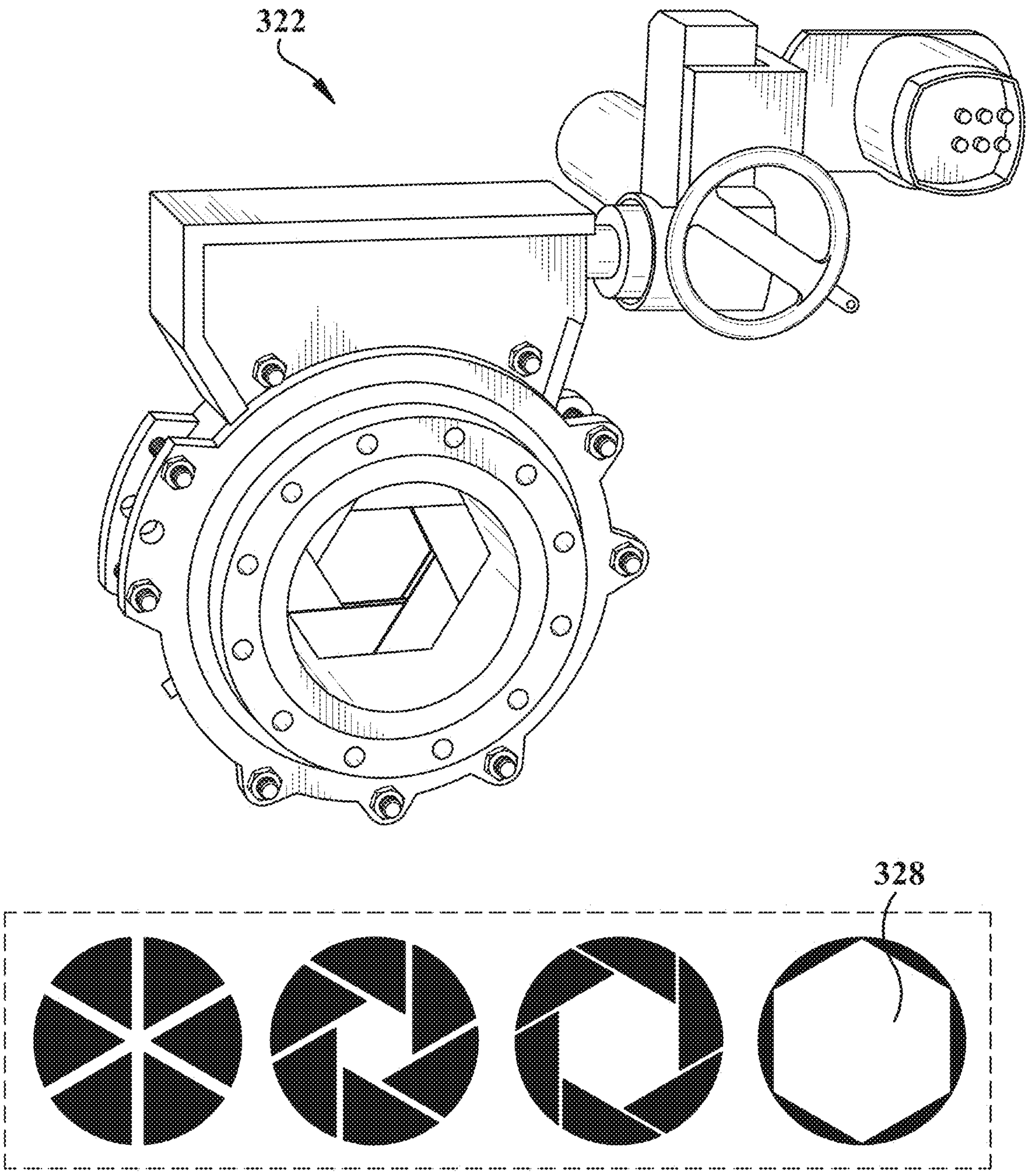
FIG. 5 is an exemplary air valve.

In certain embodiments, the air valves 322 may be dampers where the opening value used to control the air valve 322 correlates with a flapper position or flapper angle of the air valve 322. In other embodiments, the air valves 322 may be aperture valves as depicted in FIG. 5, which depicts an exemplary aperture valve along with a depiction of the arrangement of the aperture 328 ranging from fully closed to fully open. With aperture valves, the opening value used to control the air valve 322 correlates with an aperture 328 size. For example, an opening value of 0% can correlate to a fully closed aperture 328, and an opening value of 100% can correlate to a fully opened aperture 328. The controller 318 can provide the control inputs to the air valves 322, and can utilize, for example, a proportional control logic (P) or a proportional-integral control logic (PI) to achieve and maintain the desired opening values of the air valves 322.

Figure 6:
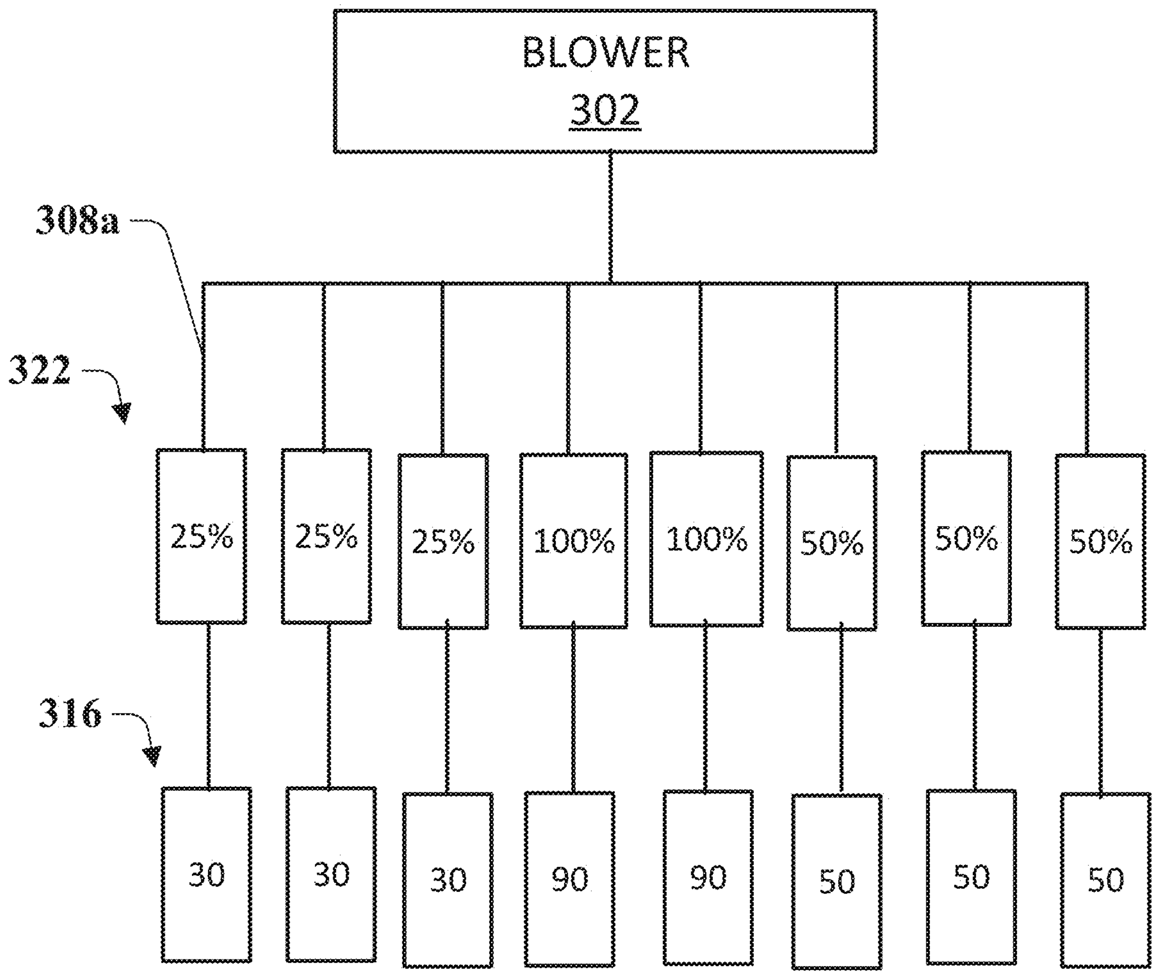
FIG. 6 is a schematic drawing of an exemplary embodiment of an air control system as part of an air cart system.

As described above, air valve 322 control can be carried out by the controller 318 by, for example, applying an equation that takes into account the metering rate or by referring to a lookup table that associates opening values of the plurality of air valves 322 with values or ranges of metering device 316 metering rates. It should be appreciated that the controller 318 can operate both the blower 302 and the air valves 322, or the controller 318 can be multiple controllers where separate controllers control the blower 302 and the air valves 322. In one example that applies to an aperture valve, the opening value can be calculated using the equation:

$$A = A_{min} + ((x - L)/(U - L) * (A_{max} - A_{min})$$

where x is the input metering rate, L is the lower limit of the metering rate, U is the upper limit of the metering rate, A is the opening value (or aperture angle), $A_{min}$ is the minimum opening value (e.g. 0%), and $A_{max}$ is the maximum opening value (e.g. 100%). It should be appreciated that other equations can be utilized. In certain examples, depending on the type of valve used, the relationship between metering rate and air flow may be linear, while in other circumstances the relationship may be non-linear. FIG. 6 schematically depicts various opening values of the air valves 322 as they correlate with the corresponding metering rate of the metering device 316 of the corresponding primary chute 308. Metering rates can be provided in a variety of units. In one example, the metering rates are provided in lb/acre. In another example, metering rates can be provided as a volume, weight, or quantity per time unit. In another example, the metering rates can be provided as a percentage of the metering device's 316 maximum rate. As shown, the blower 302 provides a total air flow that is distributed among the primary chutes 308. The controller 318 can calculate an air flow rate required in each primary chute 308 based on the metering rate for each primary chute 308. Next, the controller 318 can then perform a calculation to determine the opening value necessary in the air valves 322 to achieve the required air flow rate in each primary chute 308. For example, in a first primary chute 308*a*, the metering device 316 is configured for a metering rate of thirty (30). In this example, the metering devices 316 have a lower limit of metering rate (L) of ten (10) and an upper limit of metering rate (U) of ninety (90). Using the equation provided above, the controller 318 determines that an opening value of 25% is needed to achieve the desired air flow rate in the first primary chute 308*a*. In certain embodiments, the controller 318 can receive feedback from airflow sensors in the primary chutes 308 and can adjust the calculations to provide for a different commanded opening value to better achieve a desired air flow rate.

Figure 7:
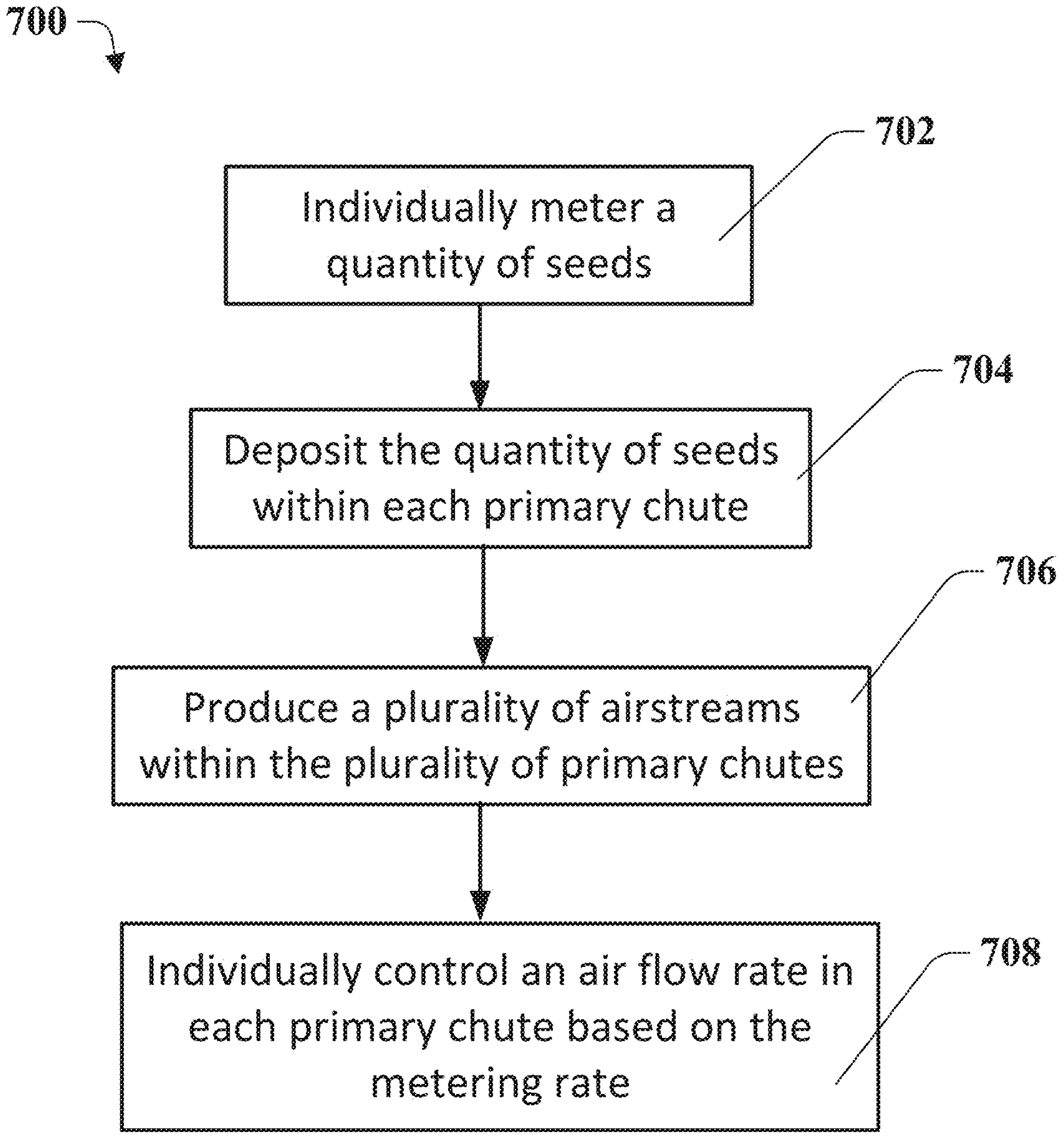
FIG. 7 is a flow chart depicting a method of operating an air cart.

Turning now to FIG. 7, a method 700 for depositing seeds using an air cart is depicted. At reference numeral 702, each metering device 116, 316 individually meters a quantity of seeds according to a metering rate that is individually configured for each metering device 116, 316. At reference numeral 704, the metering devices 116, 316 deposit the quantity of seeds within each primary chute 108, 308. At reference numeral 706, a plurality of airstreams are produced within the plurality of primary chutes 108, 308. In one embodiment, producing the plurality of airstreams involves operating a plurality of blowers 102 that includes a corresponding blower 102 for each of the plurality of primary chutes 108. In another embodiment, producing the plurality of airstreams involves operating one blower 302 that creates a total airflow that is distributed among each of the primary chutes 308.

Turning now to reference numeral 708, the air flow rate in each primary chute 108, 308 is individually controlled based on the metering rate of the metering device 116, 316 corresponding to the primary chute 108, 308. In one embodiment where there are a plurality of blowers, individually controlling the air flow rate involves individually controlling the speed of each corresponding blower 102 for each of the plurality of primary chutes 108. The speed of each corresponding blower 102 can be controlled to be proportional to the metering rate of the corresponding metering device 116. In another embodiment, individually controlling the air flow rate includes individually controlling an opening value of each air valve 322 of a plurality of air valves 322 coupled to a corresponding primary chute 308 of the plurality of primary chutes 308. The opening value of each of the plurality of air valves 322 can be proportional to the metering rate of the corresponding metering device 316.

It is to be understood that other embodiments will be utilized, and structural and functional changes will be made without departing from the scope of the claims. The foregoing descriptions of embodiments have been presented for the purposes of illustration and description. It is not intended to be exhaustive or to limit the embodiments to the precise forms disclosed. Accordingly, many modifications and variations are possible considering the above teachings. It is therefore intended that the scope of the claims is not limited by this detailed description.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" or "one or more of A, B, and/or C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes. The term "yaw axis," as appearing herein, refers to an axis drawn from top to bottom (vertically) through a vehicle such as for example a tractor or an implement. The yaw axis is perpendicular to the fore-aft and lateral axes. Yaw rotation occurs as the tractor is steered left or right while moving forward or backwards a surface or while an implement is towed left or right while being pulled by the tractor. Yaw rotation also occurs as a self-propelled implement is steered left or right while moving forward or backwards a surface.

The invention claimed is:

1. An air cart comprising:

a plurality of primary chutes, each primary chute of the plurality of primary chutes having a first end and a second end;

a plurality of metering devices, wherein each metering device of the plurality of metering devices is coupled to a corresponding primary chute of the plurality of primary chutes and is configured to deposit seed at a metering rate within the corresponding primary chute of the plurality of primary chutes at a location between the corresponding primary chute's first end and second end, wherein the metering rate of each metering device is individually configurable;

one or more blowers configured to produce a plurality of airstreams within the plurality of primary chutes, such that each of the plurality of primary chutes has an air flow rate; and a controller configured to receive the metering rate of each metering device and individually control each air flow rate of the plurality of primary chutes based on the metering rate of the metering device coupled to the corresponding primary chute.

2. The air cart of claim 1, wherein the one or more blowers is a plurality of blowers that includes a corresponding blower for each of the plurality of primary chutes.

3. The air cart of claim 2, wherein the controller is configured to individually control each air flow rate by individually controlling the speed of each corresponding blower for each of the plurality of primary chutes, based on the metering rate of the metering device coupled to the corresponding primary chute.

4. The air cart of claim 3, wherein the controller is configured to control the speed of each corresponding blower proportionally to the metering rate of the metering device coupled to the corresponding primary chute.

5. The air cart of claim 1, wherein the one or more blowers is one blower.

6. The air cart of claim 5, further comprising a plurality of air valves, each air valve of the plurality of air valves coupled to a corresponding primary chute of the plurality of primary chutes such that the plurality of air valves are configured to restrict the plurality of airstreams within the plurality of primary chutes.

7. The air cart of claim 6, wherein the controller is configured to individually control each air flow rate by individually controlling an opening value of each of the plurality of air valves based on the metering rate of the metering device coupled to the corresponding primary chute.

8. The air cart of claim 7, wherein the opening value of each of the plurality of air valves is proportional to the metering rate of the metering device coupled to the corresponding primary chute.

9. The air cart of claim 7, wherein the controller is configured to individually control the opening value of each of the plurality of air valves by referencing a table that associates the metering rate of the metering device coupled to the corresponding primary chute to a commanded opening value.

10. The air cart of claim 6, wherein the plurality of air valves are dampers or aperture valves.

11. The air cart of claim 1, further comprising a seed container configured to store the seed prior to being deposited within the primary chute, wherein the one or more blowers are coupled to the seed container and are configured to pressurize the seed container.

12. A method for depositing seeds using an air cart, the method comprising:

individually metering a quantity of seeds in each metering device of a plurality of metering devices, according to a metering rate that is individually configured for each metering device;

depositing the quantity of seeds within each primary chute of a plurality of primary chutes, wherein each primary chute has a corresponding metering device of the plurality of metering devices;

producing a plurality of airstreams within the plurality of primary chutes; and individually controlling an air flow rate in each of the plurality of primary chutes based on the metering rate of the metering device corresponding to the primary chute.

13. The method of claim 12, wherein producing the plurality of airstreams involves operating a plurality of blowers that includes a corresponding blower for each of the plurality of primary chutes.

14. The method of claim 13, wherein individually controlling the air flow rate involves individually controlling the speed of each corresponding blower for each of the plurality of primary chutes.

15. The method of claim 14, wherein the speed of each corresponding blower is controlled to be proportional to the metering rate of the corresponding metering device.

16. The method of claim 12, wherein producing the plurality of airstreams involves operating a blower and individually controlling an opening value of each air valve of a plurality of air valves coupled to a corresponding primary chute of the plurality of primary chutes.

17. The method of claim 16, wherein the opening value of each of the plurality of air valves is proportional to the metering rate of the corresponding metering device.

18. The method of claim 16, wherein individually controlling the air flow rate includes individually controlling the opening value of each of the plurality of air valves by referencing a table that associates the metering rate of the corresponding metering device to a commanded opening value.

19. An airflow control system, comprising:

one or more blowers configured to produce a plurality of airstreams within a plurality of primary chutes, such that each of the plurality of primary chutes has an air flow rate; and a controller configured to:

receive a metering rate of a plurality of metering devices that each correspond to each of the plurality of primary chutes, and individually control each air flow rate of the plurality of primary chutes based on the metering rate of the metering device of the corresponding primary chute.

20. The airflow control system of claim 19, further comprising:

a plurality of air valves, each air valve of the plurality of air valves coupled to a corresponding primary chute of the plurality of primary chutes such that the plurality of air valves are configured to restrict the plurality of airstreams within the plurality of primary chutes, wherein the controller is configured to individually control each air flow rate by individually controlling an opening value of each of the plurality of air valves based on the metering rate of the metering device coupled to the corresponding primary chute.

* * * * *